United States Patent
Huebener

(10) Patent No.: US 11,904,956 B2
(45) Date of Patent: Feb. 20, 2024

(54) REAR SPOILER ARRANGEMENT

(71) Applicant: Dr. Ing. h.c. F. Porsche Aktiengesellschaft, Stuttgart (DE)

(72) Inventor: Thomas Huebener, Stuttgart (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 79 days.

(21) Appl. No.: 17/683,408

(22) Filed: Mar. 1, 2022

(65) Prior Publication Data

US 2022/0281535 A1    Sep. 8, 2022

(30) Foreign Application Priority Data

Mar. 4, 2021   (DE) .................. 10 2021 105 180.0

(51) Int. Cl.
   *B62D 35/00*   (2006.01)
(52) U.S. Cl.
   CPC .................. *B62D 35/007* (2013.01)
(58) Field of Classification Search
   CPC .............. Y02T 10/82; B62D 35/007
   See application file for complete search history.

(56) References Cited

U.S. PATENT DOCUMENTS

| | | | |
|---|---|---|---|
| 5,076,636 A | 12/1991 | Buck et al. | |
| 2005/0029835 A1* | 2/2005 | Adams ................ | B62D 35/007 296/180.1 |
| 2015/0274223 A1 | 10/2015 | Wolf et al. | |
| 2017/0361882 A1 | 12/2017 | Weber et al. | |
| 2019/0118873 A1* | 4/2019 | Posch ................ | B62D 35/007 |
| 2020/0290688 A1* | 9/2020 | Posch ................ | B62D 37/02 |

FOREIGN PATENT DOCUMENTS

| | | | | |
|---|---|---|---|---|
| CN | 104943755 A | | 9/2015 | |
| CN | 105691475 A | * | 6/2016 | ........... B62D 35/007 |
| CN | 105691475 A | | 6/2016 | |
| DE | 102007061257 A1 | | 8/2009 | |
| DE | 102014104157 A1 | | 10/2015 | |
| DE | 102014118495 A1 | * | 6/2016 | ............. B60R 13/04 |
| DE | 102014118496 A1 | * | 6/2016 | ........... B62D 35/007 |
| DE | 102014118496 A1 | | 6/2016 | |
| DE | 102018109029 A1 | | 10/2019 | |
| DE | 102018109061 A1 | | 10/2019 | |
| DE | 102018205428 A1 | | 10/2019 | |
| DE | 102018118984 A1 | | 2/2020 | |
| EP | 1506909 A1 | * | 2/2005 | ........... B62D 35/007 |
| EP | 3339145 A1 | | 6/2018 | |
| KR | 19980047625 U | | 9/1998 | |

* cited by examiner

*Primary Examiner* — Lori Lyjak
(74) *Attorney, Agent, or Firm* — LEYDIG, VOIT & MAYER, LTD.

(57) ABSTRACT

The invention relates to a rear spoiler arrangement (3) including a displaceable air-guiding element (4) and a lower shell (5), wherein the lower shell (5) is arranged on a rear component (6) of a motor vehicle (1), wherein the air-guiding element (4) is arranged displaceably above the lower shell (5), and wherein the lower side of the lower shell (5) has a lip (9) which is composed of an elastic material.

9 Claims, 1 Drawing Sheet

REAR SPOILER ARRANGEMENT

CROSS REFERENCE TO RELATED APPLICATIONS

This application claims benefit to German Patent Application No. DE 10 2021 105 180.0, filed on Mar. 4, 2021, which is hereby incorporated by reference herein.

FIELD

The invention relates to a rear spoiler arrangement, in particular of a motor vehicle, and to a motor vehicle having such a rear spoiler arrangement.

BACKGROUND

Numerous motor vehicles having a rear spoiler arrangement are known in the prior art. Rear spoiler arrangements are thus known, in which a fixed air-guiding element is attached directly to the body and over which the air flowing over the vehicle likewise flows. Rear spoiler arrangements are also known, in which a fixed air-guiding element is arranged spaced apart from the body, wherein the air flowing over the vehicle flows around this air-guiding element. Such fixed air-guiding elements have a defined drag and a defined down force which, however, cannot be optimized in respect of a driving situation. The fixed air-guiding element thus always produces a defined drag irrespective of whether the down force is or is not required.

Rear spoiler arrangements have therefore also been disclosed, in which an air-guiding element is formed displaceably, for example such rear spoiler arrangements have been disclosed by DE 10 2018 118 984 A1 or by DE 10 2007 061 257 A1.

In the case of such rear spoiler arrangements comprising a displaceable air-guiding element, the air-guiding element can be raised such that it can be lifted into the air flow when required in order to generate a defined down force, wherein, if there is little requirement for down force, the air-guiding element is lowered in order to reduce the drag. In the case of such rear spoiler arrangements, the upper air-guiding element can rest in the retracted state on a lower shell. In the extended state of the air-guiding element, such a lower shell covers the spatial region below the air-guiding element and above a rear component of the motor vehicle. An air flow can nevertheless flow through here between the lower shell and the rear component of the motor vehicle, which can lead to an undesirable noise. In particular in the event of rain or if the motor vehicle is wet, water may also pass through the intermediate space between the lower shell and the vehicle component and emerge on the rear side, which is also undesirable.

SUMMARY

In an embodiment, the present disclosure provides a rear spoiler arrangement comprising a displaceable air-guiding element and a lower shell arranged on a rear component of a motor vehicle, the lower shell having a lower side with a lip comprising an elastic material, and wherein the displaceable air-guiding element is arranged displaceably above the lower shell.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
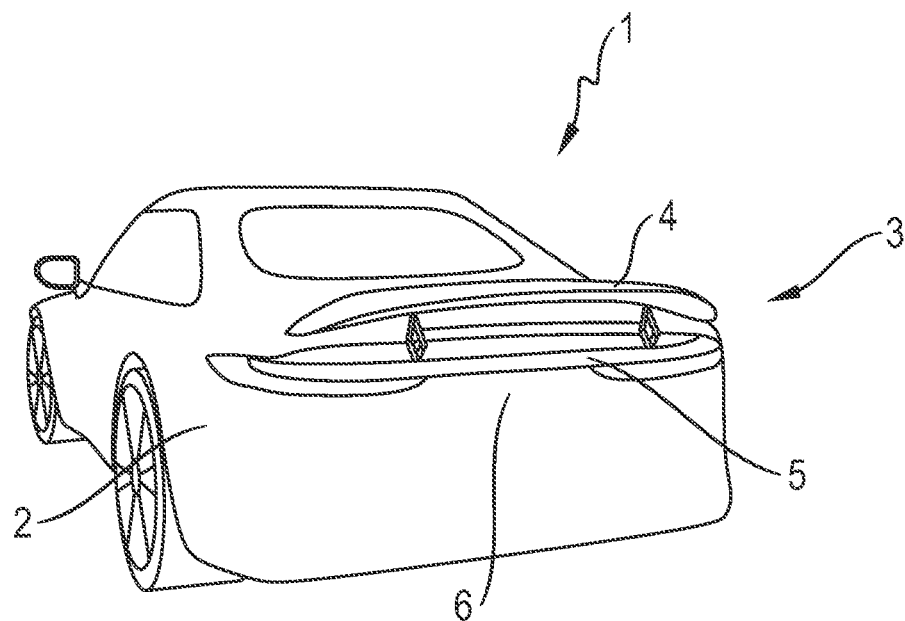
FIG. 1 shows a schematic perspective illustration of a motor vehicle having a rear spoiler arrangement according to the invention.

In an embodiment of the present invention, a rear spoiler arrangement is provided which, with a displaceable air-guiding element, avoids undesirable noises and avoids an undesirable emergence of water, wherein the rear spoiler arrangement is to be produced simply and cost-effectively. In an embodiment, a motor vehicle is provided which is improved in respect of the rear spoiler arrangement as regards the noise behavior and the behavior in the wet state.

An embodiment of the invention relates to a rear spoiler arrangement comprising a displaceable air-guiding element and comprising a lower shell, wherein the lower shell is arranged on a rear component of a motor vehicle, wherein the air-guiding element is arranged displaceably above the lower shell, wherein the lower side of the lower shell has a lip comprising an elastic material. The elastic lip makes it possible in a simple and cost-effective manner to have a desired effect on an air flow or else on water between the lower shell and the rear component, and therefore the undesirable noises and water penetration can be influenced specifically.

The term here "at the bottom" or "below" refers to a height direction, i.e., for example, in a vertical direction or virtually in a vertical direction. The lower shell is therefore arranged below the air-guiding element, and the lower side of the lower shell is arranged on the lower side of the lower shell. The vertical direction refers here, for example, to the Z direction of a motor vehicle, i.e. the upward direction.

In an embodiment, the lower shell comprises a substantially rigid material, such as, for example, of plastic or metal, wherein the elastic lip composed of the elastic material is molded onto the lower shell. Simple and cost-effective production can thereby be achieved such that an elastic lip can be produced in the lower shell in a ready from the mold form.

It is also advantageous if the lower shell is injection molded from a plastic and the elastic lip composed of the elastic material is molded onto the lower shell. The lower shell can thereby be produced with the elastic lip in one process, which once again simplifies the production.

It is also advantageous if the lower shell is produced with the elastic lip in a two-component injection molding process. The lower shell can thereby also be produced with the elastic lip in one process, which once again simplifies the production.

It is also particularly advantageous if the lower shell has an aero lip and the elastic lip is arranged on the aero lip. The elastic lip can therefore widen the substantially rigid aero lip and improve the application thereof on the rear component.

The elastic lip can also extend the aero lip. The gap between the lower shell and the rear component is therefore better bridged by the aero lip and the elastic lip.

It is also particularly advantageous if a gap is formed between the lower shell and the rear component, said gap being bridged by the elastic lip. The effect reliably achieved as a result is that the gap is bridged in a sealing manner by the elastic lip and is substantially sealed here as regards an air flow and/or spray.

It is also advantageous if the elastic lip is applied elastically to the rear component and closes the gap. Sealing can therefore be achieved over the length of the elastic lip.

An embodiment of the invention relates to a motor vehicle having a rear spoiler arrangement according to the invention.

FIG. 1 shows a motor vehicle 1 with a motor vehicle rear 2 having a rear spoiler arrangement 3.

The rear spoiler arrangement 3 has a displaceable air-guiding element 4 which can be set into a first extended position and into a second retracted position, wherein the air-guiding element 4 can also be set into at least one intermediate position or into a plurality of intermediate positions between the first position and the second position.

The rear spoiler arrangement 3 furthermore has a lower shell 5 which is arranged below the air-guiding element 4, wherein the lower shell 5 is arranged on a rear component 6 of the motor vehicle rear 2 of the motor vehicle 1. The lower shell 5 is arranged here substantially positionally fixed and non-adjustably and upwardly covers the rear component 6 of the vehicle rear 2.

The air-guiding element 4 is arranged displaceably above the lower shell 5 such that it can be extended from the second retracted position, in which the air-guiding element 4 rests substantially on the lower shell 5 or is arranged directly above the lower shell 5, into the first position. The air-guiding element 4 is raised here in relation to the lower shell 5 and projects into the air flow such that the air flow can flow around it because there is a defined distance between the lower shell 5 and the air-guiding element 4, and therefore air can also flow between the lower shell 5 and the air-guiding element 4.

Figure 2:
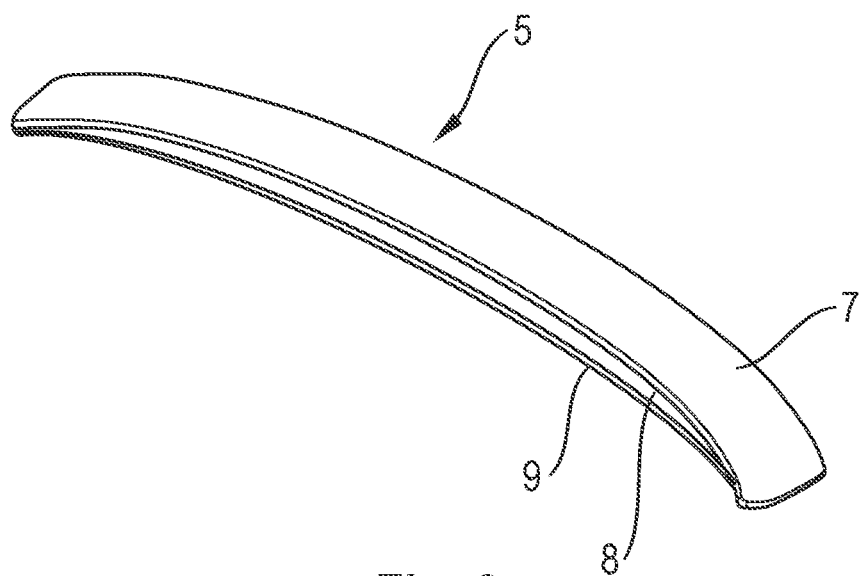
FIG. 2 shows a schematic perspective illustration of a lower shell of a rear spoiler arrangement according to the invention.

FIG. 2 shows a lower shell 5 of the rear spoiler arrangement 3 which is arranged above a rear component 6 of the motor vehicle 1. The lower shell 5 here consists substantially of a basic body 7 which is designed as a three-dimensional element and, in the exemplary embodiment shown, lies in a plane and is designed to be somewhat arcuately curved in said plane in order to follow the curved profile of the rear component 6.

The upper side of the lower shell 5 has a substantially smooth, optionally slightly modulated surface onto which the air-guiding element 4 can be lowered.

The lower side of the lower shell 5 has an aero lip 8 which protrudes downward from the basic body 7. Like the basic body 7 of the lower shell 5, the aero lip 8 is formed from a substantially rather rigid, substantially inelastic material, for example from a thermosetting plastic, a thermoplastic, etc., for example polyamide, polypropylene, polyethylene, ABS, etc. The aero lip 8 here can be composed of the same material or else can be produced from a different material, like the basic body 7. The basic body 7 of the lower shell 5 can also be produced from a metal, a metal alloy, a mixture of plastic and metal, from plastic containing fiber material, etc.

Furthermore, the lower shell 5 has an elastic lip 9 which protrudes downward from the lower shell 5 such that the elastic lip 9 can be applied in a sealing manner to the rear component 6.

As can be seen in FIG. 2, the elastic lip 9 is attached to the aero lip 8.

The elastic lip 9 is composed of an elastic material, such as, for example, from an elastomer, such as, for example, from a rubber or silicone material.

The lower shell 5 and optionally the aero lip 8 may be produced from a substantially rigid material, see above, wherein the elastic lip 9 composed of the elastic material is molded onto the lower shell 5 and onto the optional aero lip 8.

It is also advantageous here if the lower shell 5 and/or optionally the aero lip 8 are/is injection molded from a plastic, and the elastic lip 9 composed of the elastic material is molded onto the lower shell 5 optionally having the aero lip 8.

The lower shell 5 optionally having the aero lip 8 can also be produced here with the elastic lip 9 in a two-component injection molding process.

The elastic lip 9 may be arranged in such a manner that it extends the aero lip 8.

This is advantageous in particular whenever a gap is formed between the lower shell 5 and the rear component 6, said gap being bridged by the elastic lip 9. It is advantageous in particular if the elastic lip 9 is applied elastically to the rear component 6 and closes the gap.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Motor vehicle
2 Motor vehicle rear
3 Rear spoiler arrangement
4 Air-guiding element
5 Lower shell
6 Rear component
7 Basic body
8 Aero lip
9 Lip

The invention claimed is:
1. A rear spoiler arrangement comprising:
a displaceable air-guiding element; and
a lower shell arranged on a rear component of a motor vehicle, the lower shell having a lower side with a lip comprising an elastic material, and wherein the displaceable air-guiding element is arranged displaceably above the lower shell.

2. The rear spoiler arrangement as claimed in claim 1, wherein the lower shell comprises a substantially rigid material, and wherein the lip is molded onto the lower shell.

3. The rear spoiler arrangement as claimed in claim 1, wherein the lower shell is injection molded from a plastic and the lip is molded onto the lower shell.

4. The rear spoiler arrangement as claimed in claim 1, wherein the lower shell is produced with the lip in a two-component injection molding process.

5. The rear spoiler arrangement as claimed in claim 1, wherein the lower shell has an aero lip and the lip is arranged on the aero lip.

6. The rear spoiler arrangement as claimed in claim 5, wherein the lip extends the aero lip.

7. The rear spoiler arrangement as claimed in claim 1, wherein a gap is formed between the lower shell and the rear component, the gap being bridged by the lip.

8. The rear spoiler arrangement as claimed in claim 7, wherein the lip is applied elastically to the rear component and closes the gap.

9. A motor vehicle having a rear spoiler arrangement as claimed in claim 1.

* * * * *